US009577802B2

(12) United States Patent
Kazmi et al.

(10) Patent No.: US 9,577,802 B2
(45) Date of Patent: Feb. 21, 2017

(54) METHODS, NETWORK NODE, AND USER EQUIPMENT RELATED TO CHANNEL SPACING (71) Applicant: Telefonaktiebolaget LM Ericsson (publ), Stockholm (SE)

(72) Inventors: Muhammad Kazmi, Bromma (SE); Magnus Larsson, Sollentuna (SE); Olav Queseth, Solna (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 482 days.

(21) Appl. No.: 13/812,199

(22) PCT Filed: Oct. 30, 2012

(86) PCT No.: PCT/SE2012/051176
§ 371 (c)(1),
(2) Date: Jan. 25, 2013

(87) PCT Pub. No.: WO2013/070149
PCT Pub. Date: May 16, 2013

(65) Prior Publication Data
US 2014/0161052 A1    Jun. 12, 2014

Related U.S. Application Data (60) Provisional application No. 61/556,392, filed on Nov. 7, 2011.

(51) Int. Cl.
H04L 5/00       (2006.01)
(52) U.S. Cl.
CPC ............ H04L 5/0041 (2013.01); H04L 5/001 (2013.01)

(58) Field of Classification Search
CPC ...... H04L 5/0041; H04L 5/0053; H04L 5/001; H04L 5/0094; H04W 72/042; H04W 72/0406
(Continued)

(56) References Cited

U.S. PATENT DOCUMENTS

2009/0316627 A1*  12/2009  Fonseka et al. ............. 370/328
2010/0149961 A1*   6/2010  Lee et al. ................... 370/204
(Continued)

FOREIGN PATENT DOCUMENTS

RU    2330379 C2       7/2008
WO    2011041623 A1    4/2011
WO    2011112004 A2    9/2011

OTHER PUBLICATIONS

3rd Generation Partnership Project. "Channel Arrangement for LTE Advanced." 3GPP TSG-RAN WG4 Ad hoc meeting #10-03, R4-102422, Jun. 28-Jul. 2, 2010, pp. 1-5, Bratislava, Slovakia.
(Continued)

Primary Examiner — Jamal Javaid
(74) Attorney, Agent, or Firm — Murphy, Bilak & Homiller, PLLC (57) ABSTRACT It is presented a method for obtaining a capability of channel spacing between component carriers used in carrier aggregation for a user equipment, UE. The method is performed in a network node and comprises the step of: determining, from a plurality of alternatives, the capability of channel spacing for the UE based on signalling between the UE and the network node, the channel spacing capability comprising at least one of the alternatives of: a multiple of 300 kHz, a multiple of 15 kHz and any other channel spacing. A corresponding network node and UE are also presented.

18 Claims, 5 Drawing Sheets (58) Field of Classification Search
USPC .................. 370/329, 328, 330, 252, 241
See application file for complete search history.

(56) References Cited

U.S. PATENT DOCUMENTS

2012/0044922 A1* 2/2012 Ishii .......................... 370/338
2012/0106477 A1* 5/2012 Kwon et al. ................ 370/329

OTHER PUBLICATIONS

3rd Generation Partnership Project. "Text Proposal for LTE-A UE TR Clause 5.7.1 Channel Spacing." 3GPP TSG-RAN WG4 Meeting Ad Hoc #3, R4-102616, Jun. 28-Jul. 2, 2010, pp. 1-3, Bratislava, Slovakia.

3rd Generation Partnership Project. "Carrier spacing for intra-band CA." TSG-RAN Working Group 4 (Radio) meeting #56, R4-103198, Aug. 23-27, 2010, pp. 1-4, Madrid, Spain.

3rd Generation Partnership Project. "Ad hoc minutes: MSR-NC." 3GPP TSG-RAN WG4 meeting #56, R4-103396, Aug. 23-27, 2010, pp. 1-2, Madrid, Spain.

3rd Generation Partnership Project. "On carrier spacing for NC CA." 3GPP TSG-RAN WG4 Meeting #61, R4-116037, Nov. 14-18, 2011, pp. 1-3, San Francisco. USA.

3rd Generation Partnership Project, 3GPP TS 36.300 V10.5.0 (Sep. 2011), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10), Sep. 2011, pp. 45-46.

\* cited by examiner

METHODS, NETWORK NODE, AND USER EQUIPMENT RELATED TO CHANNEL SPACING

TECHNICAL FIELD

The invention relates to methods, a network node, and user equipment related to channel spacing, for use in carrier aggregation of cellular networks.

BACKGROUND

In cellular networks, such as Long Term Evolution (LTE), a concept of carrier aggregation (CA) is being deployed. CA implies that several (two or more) Component Carriers (CC) can be utilised for communication between a network node and a user equipment (UE). The CCs can be contiguous in the frequency domain or non-contiguous.

The distance between centre frequencies of CCs is called channel spacing of the CCs. All subcarriers in LTE resource blocks are aligned to one a single 15 kHz grid. Moreover, the centre subcarrier is aligned to a 100 kHz grid. This is done in order to simplify UE carrier search and attachment procedures. In order to accommodate both these requirements, channel spacing of CCs need to align to a grid of multiples of 300 kHz.

A small allocated frequency block for a CC, say 5 MHz will, with a 5 MHz channel bandwidth LTE carrier, not have much, if any, frequency space available to be shifted to align to a 300 kHz grid. An alignment to a 300 kHz grid could mean an adjustment by up to 200 kHz, when the band edges conform to even 100 kHz (which is typically the case). This means, in some scenarios, when considering guard bands at the edge of the frequency block, that an operator will not be able to use the non contiguous intra band carrier aggregation at all.

It would be of great benefit if, whenever possible, even small frequency blocks could be used for component carriers in carrier aggregation, while still supporting legacy UEs.

SUMMARY

It is an object to improve the ability to place component carriers when carrier aggregation is used.

According to a first aspect, it is presented a method for obtaining a capability of channel spacing between component carriers used in carrier aggregation for a user equipment, UE. The method is performed in a network node and comprises the step of: determining, from a plurality of alternatives, the capability of channel spacing for the UE based on signalling between the UE and the network node, the channel spacing capability comprising at least one of the alternatives of: a multiple of 300 kHz, a multiple of 15 kHz and any other channel spacing.

By obtaining the capability of channel spacing between component carriers of the particular UE, component carriers can, in at least some cases, be better placed in the frequency spectrum. For example, when small frequency blocks are allocated, these can be better utilised when the capability of the particular UE is known, in terms of channel spacing between component carriers.

The method may further comprise the step, prior to the step of determining, of: receiving signalling from the UE, the signalling indicating the capability of channel spacing, the channel spacing capability comprising at least one of the alternatives of: a multiple of 300 kHz, a multiple of 15 kHz, and any other channel spacing. The UE thus reports its capability to the network node.

The method may further comprise the step of: transmitting a request for capability of channel spacing to the UE. In other words, the channel spacing capability is reported from the UE in response to a request from the network node.

According to a second aspect, it is presented a method for obtaining a capability of channel spacing between component carriers used in carrier aggregation for a user equipment, UE. The method is performed in a network node and comprises the step of: determining, from a plurality of alternatives, the capability of channel spacing for the UE based on a pre-defined rule relating a channel spacing to a type of carrier aggregation, the channel spacing capability comprising at least one of the alternatives of: a multiple of 300 kHz, a multiple of 15 kHz and any other channel spacing. Using the pre-defined rule, the UE is relieved of any signalling with regard to explicitly indicating its capability of channel spacing between component carriers.

The method may further comprising the step, prior to the step of determining, of: detecting the capability of channel spacing by comparing performance of intra-band carrier aggregation when the UE is connected to different cells, where component carriers in some cells are sent with 300 kHz channel spacing, in other cells with 15 KHz or with any other channel spacing.

The step of detecting the capability of channel spacing may comprise comparing the performance of intra-band carrier aggregation with a pre-determined carrier aggregation performance.

The step of determining the capability of channel spacing may comprise determining the capability of channel spacing based on a type of carrier aggregation supported by the UE.

The step of determining the capability of channel spacing may comprise determining the capability of channel spacing for the UE based on a number of IFFT/FFT, Inverse Fast Fourier Transform/Fast Fourier Transform, which are supported by the UE receiver and/or UE transmitter.

The step of determining the capability of channel spacing may comprise determining that the UE supports any channel spacing when the UE supports more than one IFFT/FFT for carrier aggregation.

The step of determining the capability of channel spacing may comprise determining the capability of channel spacing for the UE to be any channel spacing when non contiguous carrier aggregation is supported by the UE.

The step of determining the capability of channel spacing may comprise determining the capability of channel spacing for the UE to be any channel spacing when inter-band carrier aggregation is supported by the UE.

The step of determining the capability of channel spacing may comprise determining the capability of channel spacing for the UE based on the frequency band(s) used for carrier aggregation.

The method may further comprise the step of: storing the capability of channel spacing for the UE for network management or configuration tasks.

The method may further comprise the step of: deciding what channel spacing to use between component carriers in carrier aggregation for the UE, based on the determined capability of channel spacing for the UE.

The step of deciding what channel spacing to use may comprise: deciding which one of available component carriers to use in carrier aggregation for the UE, based on the determined capability of channel spacing for the UE and based on the channel spacing of available component carriers, where there are several component carriers configurations available in the network of the network node, having channel spacing being a multiple of 300 kHz and channel spacing being a multiple of 15 kHz.

The method may further comprise the step of: configuring the UE to operate in carrier aggregation with a channel spacing between component carriers based on the determined capability of channel spacing for the UE.

The method may further comprise the step of: operating the UE without carrier aggregation when the determined capability of channel spacing for the UE is not supported by the network node.

The method may further comprise the step of: forwarding the determined capability of channel spacing for the UE to other network nodes.

According to a third aspect, it is presented a network node arranged to obtain a capability of channel spacing between component carriers to be used in carrier aggregation for a user equipment, UE. The network node comprises: a processor; and a computer program product. The computer program product stores instructions that, when executed by the processor, causes the network node to: determine, from a plurality of alternatives, the capability of channel spacing for the UE based on signalling between the UE and the network node, the channel spacing capability comprising at least one of the alternatives of: a multiple of 300 kHz, a multiple of 15 kHz and any other channel spacing.

According to a fourth aspect, it is presented a network node arranged to obtain a capability of channel spacing between component carriers to be used in carrier aggregation for a user equipment, UE, the network node comprising: a processor; and a computer program product, The computer program product stores instructions that, when executed by the processor, causes the network node to: determine, from a plurality of alternatives, the capability of channel spacing for the UE based on a pre-defined rule relating a channel spacing to a type of carrier aggregation, the channel spacing capability comprising at least one of the alternatives of: a multiple of 300 kHz, a multiple of 15 kHz and any other channel spacing.

According to a fifth aspect, it is presented a method arranged to providing a capability of channel spacing between component carriers to be used in carrier aggregation for a user equipment, UE. The method is performed by the UE and comprises the step of: transmitting signalling to the network node, the signalling indicating a capability of channel spacing between component carriers used in carrier aggregation for the UE, the channel spacing capability comprising at least one of the alternatives of: a multiple of 300 kHz, a multiple of 15 kHz, and any other channel spacing.

The step of transmitting may comprise transmitting the capability separately for each supported band.

The step of transmitting may comprise transmitting the capability for a group of supported bands.

The step of transmitting may comprise transmitting the capability separately for uplink and downlink carrier aggregation.

The step of transmitting may comprise transmitting the capability jointly for both uplink and downlink carrier aggregation.

The step of transmitting may be performed proactively.

The method may further comprise the step of: receiving a request for capability of channel spacing from the network node. In that case, the step of transmitting is performed in response to the step of receiving a request.

According to a sixth aspect, it is presented a user equipment, UE, arranged to providing a capability of channel spacing between component carriers to be used in carrier aggregation for the UE. The UE comprising: a processor; and a computer program product. The computer program product stores instructions that, when executed by the processor, causes the UE to: transmit signalling to the network node, the signalling indicating a capability of channel spacing between component carriers used in carrier aggregation for the UE, the channel spacing capability comprising at least one of the alternatives of: a multiple of 300 kHz, a multiple of 15 kHz and any other channel spacing.

It is to be noted that any feature of the first, second, third, fourth, fifth or sixth aspects may, where appropriate, be applied to any other of these aspects.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described with full details hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
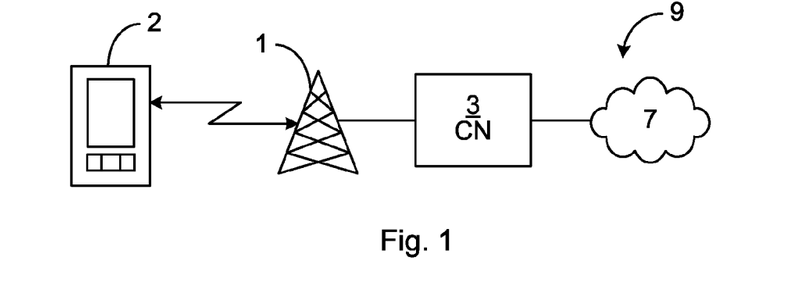
FIG. 1 is a schematic diagram illustrating an environment where embodiments presented herein can be applied.

FIG. 1 is a schematic diagram illustrating a cellular network 9 where embodiments presented herein may be applied. The cellular network 9 comprises a core network 3 and one or more network nodes 1, here in the form of evolved Node Bs, also known as eNode Bs or eNBs. The network nodes 1 could also be in the form of Node Bs, BTSs (Base Transceiver Stations), BS (Base Station) and/or BSSs (Base Station Subsystems), etc. The network nodes 1 provide radio connectivity to a plurality of user equipments (UEs) 2. The term user equipment is also known as mobile communication terminal, wireless terminal, mobile terminal, user terminal, user agent, machine-to-machine devices etc., and can be, for example, what today is commonly known as a mobile phone or a tablet/laptop with wireless connectivity or fixed mounted terminal. Moreover, the UEs 2 may, but do not need to, be associated with a particular end user.

The cellular network 9 may e.g. comply with any one or a combination of LTE-SAE (Long Term Evolution-System Architecture Evolution), W-CDMA (Wideband Code Division Multiplex), EDGE (Enhanced Data Rates for GSM (Global System for Mobile communication) Evolution), GPRS (General Packet Radio Service), CDMA2000 (Code Division Multiple Access 2000), or any other current or future wireless network, such as LTE-Advanced, as long as the principles described hereinafter are applicable.

Uplink (UL) communication (from the UE to the network) and downlink (DL) communication (from the network to the UE) between each UE 2 and the network node 1 occur over a wireless radio interface. The quality of the wireless radio interface to each UE 2 can vary over time and depending on the position of the UE 2, due to effects such as fading, multipath propagation, etc.

The network nodes 1 are also connected to the core network 3 for connectivity to central functions and external networks 7, such as the Internet or other operators.

Figure 2:
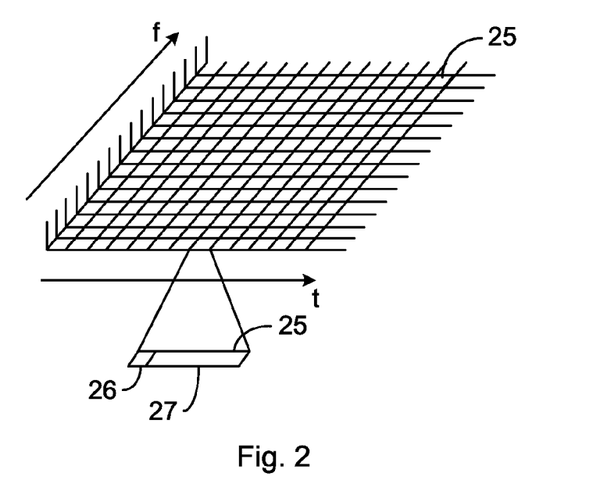
FIG. 2 is a schematic diagram illustrating the physical resources for LTE (Long Term Evolution) downlink.

In order to fully describe a way of implementing embodiments, the embodiments presented herein are described using terminology and signaling used in LTE. However, it is to be noted that the embodiments are not restricted thereto and may be applied to any suitable current or future standard FIG. 2 is a schematic diagram illustrating the physical resources for LTE (Long Term Evolution) downlink. LTE uses OFDM (Orthogonal Frequency Division Multiplexing) in the downlink and DFT (Discrete Fourier Transform)-spread OFDM in the uplink. The basic LTE downlink physical resource can thus be seen as a time-frequency grid as illustrated in FIG. 2, where each resource element 25 corresponds to one OFDM subcarrier during one OFDM symbol interval. Each resource element 25 comprises cyclic prefix section 26 and a main section 27.

An Inverse Fast Fourier Transform (IFFT) is used in an OFDMA receiver for receiving an OFDMA signals. A Fast Fourier Transform (FFT) is used in an OFDMA/(single frequency-frequency division multiple access (SF-FDMA) based transmitter for transmitting OFDMA/SF-FDMA signals. The terms FFT and IFFT are interchangeably called as Discrete Fourier Transform (DFT) and Inverse Discrete Fourier transform (IDFT), respectively. More specifically in LTE, the uplink transmission takes place using SF-FDMA, which is a special form of OFDMA.

Figure 3:
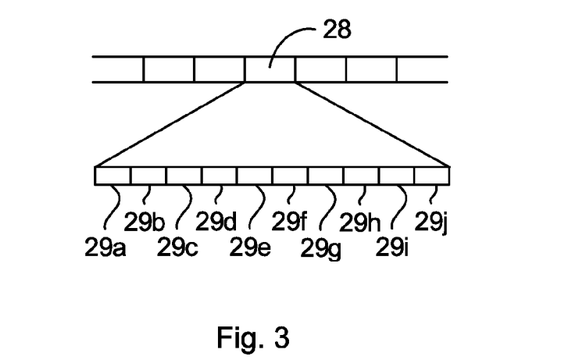
FIG. 3 is a schematic diagram illustrating LTE time-domain structure.

FIG. 3 is a schematic diagram illustrating LTE time-domain structure. In the time domain, LTE downlink transmissions are organised into radio frames 28 of 10 ms, each radio frame consisting of ten equally-sized subframes 29a-j of length $T_{subframe}=1$ ms, as can be seen in FIG. 3.

Furthermore, the resource allocation in LTE is typically described in terms of resource blocks, where a resource block corresponds to one slot (0.5 ms) in the time domain and twelve contiguous subcarriers in the frequency domain. A pair of two adjacent resource blocks in time direction (1.0 ms) is known as a resource block pair. Each slot consists of six or seven consecutive OFDM symbols depending upon the length of the cyclic prefix (CP). Resource blocks are numbered in the frequency domain, starting with 0 from one end of the system bandwidth.

Carrier Aggregation

Figure 4:
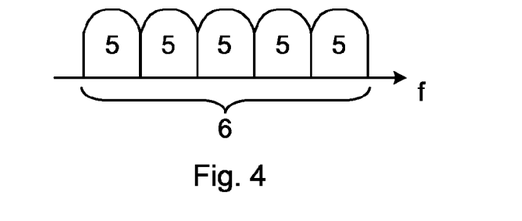
FIG. 4 is a schematic diagram illustrating carrier aggregation in the network of FIG. 1.

FIG. 4 is a schematic diagram illustrating carrier aggregation in the network of FIG. 1. Here five contiguous component carriers 5 are combined in an aggregated bandwidth 6.

The LTE Rel-8 (Release 8) standard has recently been standardised, supporting bandwidths up to 20 MHz. However, in order to meet the IMT (International Mobile Communications)-Advanced requirements, 3GPP (Third Generation Partnership Project) has initiated work on LTE Rel-10. One of the parts of LTE Rel-10 is to support bandwidths larger than 20 MHz. One important requirement on LTE Rel-10 is to assure backward compatibility with LTE Rel-8. This should also include spectrum compatibility. That would imply that an LTE Rel-10 carrier, wider than 20 MHz, should appear as a number of LTE carriers to an LTE Rel-8 terminal. Each such carrier can be referred to as a Component Carrier (CC).

In particular for early LTE Rel-10 deployments it can be expected that there will be a smaller number of LTE Rel-10-capable terminals compared to many LTE legacy terminals. Therefore, it is necessary to assure an efficient use of a wide carrier also for legacy terminals, i.e. that it is possible to implement carriers where legacy terminals can be scheduled in all parts of the wideband LTE Rel-10 carrier. The straightforward way to obtain this would be by means of Carrier Aggregation. Carrier Aggregation implies that an LTE Rel-10 terminal can receive multiple CC, where the CC have, or at least the possibility to have, the same structure as a Rel-8 carrier. The same structure as Rel-8 implies that all Rel-8 signals, e.g. (primary and secondary) synchronization signals, reference signals, system information are transmitted on each carrier. Carrier Aggregation is illustrated in FIG. 4.

The number of aggregated CC as well as the bandwidth of the individual CC may be different for uplink and downlink. A symmetric configuration refers to the case where the number of CCs in downlink and uplink is the same whereas an asymmetric configuration refers to the case that the number of CCs is different. It is important to note that the number of CCs configured in a cell area may be different from the number of CCs seen by a terminal: A terminal may for example support more downlink CCs than uplink CCs, even though the network offers the same number of uplink and downlink CCs.

During initial access, an LTE Rel-10 terminal behaves similar to an LTE Rel-8 terminal. Upon successful connection to the network a terminal may—depending on its own capabilities and the network—be configured with additional CCs in the UL and DL. Configuration is based on RRC (Radio Resource Control). Due to the heavy signaling and rather slow speed of RRC signaling it is envisioned that a terminal may be configured with multiple CCs even though not all of them are currently used. If a terminal is configured on multiple CCs this would imply it has to monitor all DL CCs for Physical Downlink Control Channel (PDCCH) and Physical Downlink Shared Channel (PDSCH). This implies a wider receiver bandwidth, higher sampling rates, etc. resulting in high power consumption.

To mitigate the above problems LTE Rel-10 supports, on top of configuration, also activation of CCs. The terminal monitors only configured and activated CCs for PDCCH and PDSCH. Since activation is based on Medium Access Control (MAC) control elements—which are faster than RRC signaling—activation/de-activation can follow the number of CCs that is required to fulfil the current data rate needs. Upon arrival of large data amounts multiple CCs are activated, used for data transmission, and de-activated if not needed anymore. All but one CC—the DL Primary CC (DL PCC)—can be de-activated. Activation provides therefore the possibility to configure multiple CCs but only activate them on a need basis. Most of the time a terminal would have one or very few CCs activated resulting in a lower reception bandwidth and thus lower battery consumption.

The CCs belonging to the CA may belong to the same frequency band (aka intra-band CA) or to different frequency band (inter-band CA) or any combination thereof (e.g. 2 CCs in band A and 1 CC in band B). The carriers in intra-band CA can be adjacent (aka contiguous) or non-adjacent (aka non-contiguous). In non-adjacent intra-band CA (aka non-contiguous CA), the carriers in gaps are used by other operators. Typically in intra-band CA the UE may require single RF receiver chain and RF transmitter chain for receiving and transmitting the aggregated carriers respectively especially when the total aggregated carriers are within certain limit e.g. 20 MHz in total for HSPA or 40 MHz in total for LTE. Otherwise the UE may have to implement more than one RF transmitter/receiver chains for aggregated larger number of carriers and particularly in case of non-contiguous CA.

The inter-band CA comprises carriers distributed over two bands. It is also called as dual-band-dual-carrier-HSDPA (High-Speed Downlink Packet Access) or 4C-HSDPA in HSPA (High-Speed Packet Access). Furthermore the CCs in intra-band CA may be adjacent or non-adjacent in frequency domain (aka intra-band non-adjacent CA).

A hybrid CA comprising intra-band adjacent, intra-band non-adjacent and inter-band is also possible.

Using carrier aggregation between carriers of different technologies is also referred to as "multi-RAT carrier aggregation" (RAT corresponds to Radio Access Technology) or "multi-RAT-multi-carrier system" or simply "inter-RAT carrier aggregation". For example, the carriers from W-CDMA and LTE may be aggregated. Another example is the aggregation of LTE and CDMA2000 carriers. For the sake of clarity the carrier aggregation within the same technology may be regarded as 'intra-RAT' or simply 'single RAT' carrier aggregation. In inter-RAT CA, one of the systems may be configured as the primary system and another one or the remaining ones as the secondary system or auxiliary system. The primary system may carry basic signaling and configuration information between the network and the UE.

It should also be noted that the CCs in CA may or may not be co-located in the same site or base station. For instance the CCs may originate (i.e. transmitted/received) at different locations (e.g. from non-located BS (Base Station) or from BS and RRH (Remote Radio Head) or RRU (Remote Radio Unit)). The well known examples of combined CA and multi-point communication are heterogeneous network, multi-tier/multi-layered system (e.g. mixed of low and high power nodes such as pico and macro BS, DAS (Distributed Antenna System), RRH, RRU, CoMP (Co-ordinated Multi-Point), multi-point transmission/reception, joint processing (JP) etc. The embodiments presented herein also apply to the multi-point carrier aggregation systems.

In order to allow operators to more efficiently utilise large chunk of available spectrum, a concept of extension carrier has been proposed. The term extension carrier, extension component carrier, segment etc. all refer to the same concept. We will use the term extension carrier for consistency. An extension carrier is generally a smaller carrier compared to other component carriers and can be used by an operator to fill in the available spectrum. To illustrate this point, let us consider an example in which a contiguous 80 MHz spectrum is available. An operator can use 4×20 MHz carriers each with 100 resource blocks. This configuration will maintain backward compatibility with release 8 legacy 20 MHz carrier in terms of resource blocks (there are 100 RBs per 20 MHz in release 8). However, a small portion of spectrum about 7 MHz remains unused. Thus by concatenating a small extension carrier of 5 MHz, the available 80 MHz can be more efficiently utilised. As stated earlier, a guard band or small unused spectrum (e.g. at least 1 MHz) at the edges of the aggregated carriers is to be maintained to meet the radio requirements. This means 100% spectrum utilization is not practically possible. Nonetheless, as illustrated by the above example an introduction of an extension carrier could significantly improve the spectral efficiency.

There are primarily two versions of the concept of an extension carrier. In one scenario the extension carrier is fully backward compatible to release 8 carriers. This means all control channels are used in an extension carrier. An alternate solution comprises an extension carrier with data only resource blocks.

It should be noted that the embodiments presented herein are not restricted to the particular terminology used here. It should be noted that also during the carrier aggregation work for LTE, various terms have been used to describe for example Component Carriers, or CCs in short. The embodiments presented herein are therefore applicable e.g. to situations where terms like multi-cell or dual-cell operation is described, e.g. with a Primary (Serving) Cell PCell and potentially multiple Secondary (Serving Cells) SCell, or alike.

Scheduling of a CC is done on the PDCCH via downlink assignments. Control information on the PDCCH is formatted as a Downlink Control Information (DCI) message. In Rel-8 a terminal only operates with one DL and one UL CC, whereby the association between DL assignment, UL grants and the corresponding DL and UL CCs is clear. In Rel-10, two modes of Carrier Aggregation need to be distinguished. The first case is very similar to the operation of multiple Rel-8 terminals, a DL assignment or UL grant contained in a DCI message transmitted on a CC is either valid for the DL CC itself or for associated (either via cell-specific or UE specific linking) UL CC. A second mode of operation augments a DCI message with the Carrier Indicator Field (CIF). A DCI containing a DL assignment with CIF is valid for that DL CC indicted with CIF and a DCI containing an UL grant with CIF is valid for the indicated UL CC.

Carrier Aggregation and Channel Spacing

All subcarriers in LTE resource blocks are aligned to one and the same 15 kHz grid. However the centre subcarrier is aligned to a 100 kHz grid. This is done in order to simplify UE carrier search (aka initial cell search) and attachment procedures. The channel raster in LTE is 100 kHz. (The centre subcarrier is actually not transmitted in the downlink, since it corresponds to DC in the baseband, but the condition still applies).

Nominal channel spacing between carriers, for carrier aggregation, is subject to a special condition in order to align all subcarriers on a common 15 kHz grid. The modulo 100 kHz carrier centre frequency condition and the 15 kHz sub carrier condition results in a requirement for contiguous intra band CA which is expressed as follows in 3GPP release-10:

For intra-band contiguously aggregated carriers the channel spacing between adjacent component carriers shall be multiple of 300 kHz, which in turn is multiple of 100 kHz channel raster and 15 kHz sub carrier spacing.

For release-10 contiguous carrier aggregation, the n times 300 kHz condition is reasonable since transmission and/or reception of signals occur over one contiguous block, which is coordinated and controlled by one operator and we have a continuum to use for adjustments.

Non-contiguous carrier aggregation is discussed for the next 3GPP release (Rel-11). Non-contiguous spectrum is defined as consisting of two or more sub-Mocks separated by sub-Mock gap(s). The carrier(s) in gaps can e.g. belong to another operator.

The n times 300 kHz condition will be difficult to extend to non contiguous intra band carrier aggregation. A small frequency block, say 5 MHz, allocated by authorities will, with a 5 MHz channel bandwidth LTE carrier will simple not have any frequency space available to be shifted to align to a 300 kHz grid. An alignment to a 300 kHz grid could mean an adjustment by up to 200 kHz if we assume that the band edges conform to even 100 kHz (which they often do). This means, in some scenarios, an operator will not be able to use the non contiguous intra band carrier aggregation at all.

Solutions

The term channel spacing is to be construed as the separation in frequency between the dc subcarrier centre frequencies of two carriers. If the carriers are aggregated, i.e. part of a carrier aggregated set of carriers, then the carriers are sometimes referred to a component carriers.

The current 3GPP standard defines requirements only for contiguous carrier aggregation, where the approved standard mandates that channel spacing between adjacent component carriers shall be multiple of 300 kHz.

The future releases of 3GPP, release-11 and onwards, might define other channel spacing requirements.

The embodiments presented herein comprise the following:

Method in a UE for signaling its capability to the network node on its capability of supporting any channel spacing, and that may relate to one or more of:
  Capability of supporting any channel spacing i.e. UE indicates it has no restriction on channel spacing
  Capability of supporting a channel spacing between component carriers (adjacent or not) that is a multiple of 300 kHz
  Capability of supporting a channel spacing between component carriers is a multiple of 15 kHz (adjacent or not).

The UE may report this capability:
  Separately for each supported band or for group of supported bands;
  For both uplink and downlink carrier aggregation or separately for uplink and downlink carrier aggregation;
  Proactively or in response to or based on an explicit request from the network.
  Implicitly reporting by indicating support for multiple carriers a network node if the network node signals the component carrier spacing is a multiple of 300 kHz, but not indicating support of multiple carriers if the network node signals a carrier spacing which is not a multiple of 300 kHz.

It is also presented a method in a network node (e.g. serving eNode B) for identifying the UEs, which are capable of supporting channel spacing, channel spacing between component carriers (adjacent or not) shall be multiple of 300 kHz only or channel spacing between adjacent component carriers shall be multiple of 15 kHz (adjacent or not), wherein the said identification of the UE in the network node is based on:
  The reported UE capability via explicit signaling or
  The autonomous determination or detection, wherein the autonomous detection is based on one or more criteria e.g. by comparing the performance of intra-band CA when UEs are connected to different cells where CCs in some cells are sent with 300 kHz channel spacing, others with 15 KHz or with any other channel spacing.

It is also presented a method in a network node for deciding whether the UE should perform carrier aggregation of CCs transmitted (adjacent or not) with channel spacing which is a multiple of 300 kHz only or transmitted with a channel spacing which is a multiple of 15 kHz (adjacent or not), or transmitted with any other channel spacing.
  The decision is based on the identification of the UE capability.
  The contrary is possible as well, to prioritise to schedule legacy UE depending on the traffic mix of reported and detected capabilities.

It is also presented a method in a network node for forwarding the information associated with the 'received channel spacing' or 'determined channel spacing' to other network nodes, which may use this for radio management tasks.

The methods above can be combined whenever appropriate.

Figure 5:
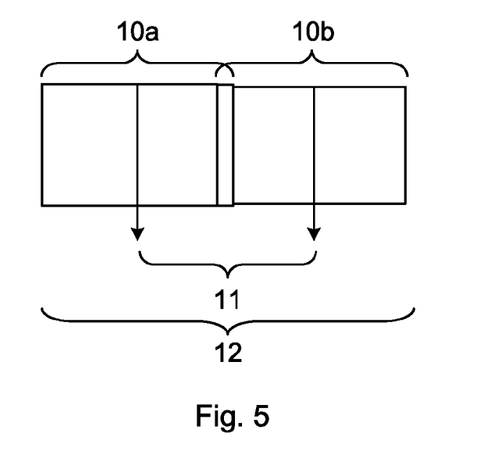
FIG. 5 is a schematic diagram illustrating aggregated bandwidth in the network of FIG. 1.

The nominal channel spacing between two adjacent aggregated E-UTRA (evolved UMTS (Universal Mobile Telecommunications System) Terrestrial Radio Access) carriers is defined as follows:

$$\text{Nominal channel spacing} = \left\lfloor \frac{BW_{Channel(1)} + BW_{Channel(2)} - 0.1|BW_{Channel(1)} - BW_{Channel(2)}|}{0.6} \right\rfloor 0.3$$

where $BW_{Channel(1)}$ and $BW_{Channel(2)}$ are the channel bandwidths of the two respective E-UTRA component carriers in MHz. The square brackets with plain upper parts represent a floor function, i.e. an integer value with all decimals discarded without rounding. The channel spacing for intra-band contiguous carrier aggregation can be adjusted to any multiple of 300 kHz less than the nominal channel spacing to optimise performance in a particular deployment scenario FIG. 5 is a schematic diagram illustrating aggregated bandwidth in the network of FIG. 1. Here there is a first component carrier boa and a second component carrier 10b. When the first and second component carriers each occupy 20 MHz, the nominal channel spacing 11 is, given by the formula above 19.8 MHz. This gives an aggregated bandwidth 12 of 39.8 MHz.

Figure 6:
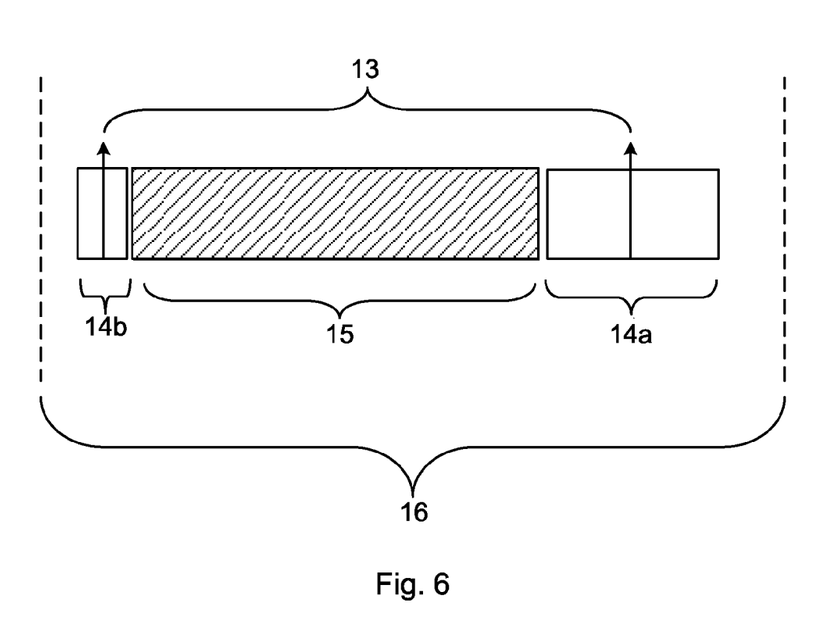
FIG. 6 is a schematic diagram illustrating non-contiguous carrier aggregation in the network of FIG. 1.

FIG. 6 is a schematic diagram illustrating non-contiguous carrier aggregation in the network of FIG. 1. When we expand to non-contiguous operation we find a number of problems: Firstly, the bands are very big, up to 200 MHz in some cases (Band 42 and 43 as defined by E-UTRA).

Secondly, band segments can be far from each other, close to the end of the bands. Thirdly, band segments can be small, like 5 MHz, which is also a common band allocation unit size. Fourthly, there will be at least one uncoordinated gap in between LTE carrier blocks.

A separate 5 Hz LTE block will be common in some markets. If such a block were to be populated with a 5 MHz channel bandwidth LTE carrier, then a modulo 300 kHz condition would result in an implicit requirement to move the centre frequency up to 200 kHz. FIG. 6 illustrates a first block 14*a* of a larger bandwidth, e.g. 20 MHz, and a second block 14*b* of a smaller bandwidth, e.g. 5 MHz. In between the first and second blocks 14*a*-*b*, there is an uncoordinated block 15, which could e.g. belong to another operator. Between the centre frequencies of the first and second blocks 14*a*-*b* the channel spacing is defined.

Figure 7:
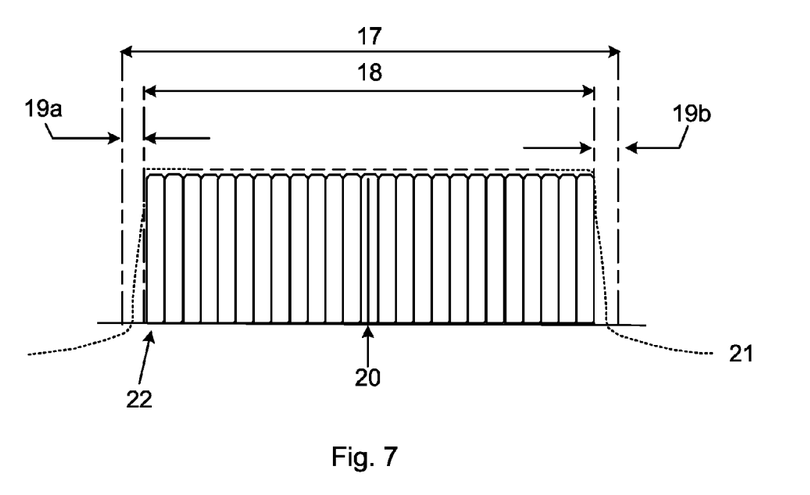
FIG. 7 is a schematic diagram illustrating a structure of a 5 MHz LTE carrier of the network of FIG. 1.

FIG. 7 is a schematic diagram illustrating a structure of a 5 MHz LTE carrier of the network of FIG. 1. A 5 MHz channel bandwidth 17 LTE carrier has only a 250 kHz separation 19*a*-*b* from the position of the channel edge to the position of the first resource block. This makes a 200 kHz translation (shift of carrier frequency), in any direction, very difficult. In FIG. 7, the centre frequency 20 is also shown, as well as a number of resource blocks 22. A typical occupancy 21 is shown, tapering down from the end resource blocks.

Methods to mitigate these issues are presented whereby:
The network (such as the network node 1 of FIG. 1) can be informed whether the UE supports any channel spacing, channel spacing between component carriers (adjacent or not) shall be multiple of 300 kHz only or channel spacing between adjacent component carriers shall be multiple of 15 kHz (adjacent or not).

The network decides whether to perform non-contiguous intra-band CA for a particular UE or not based on the received UE capability information.

The network decides whether to perform non contiguous intra-band CA for a particular UE or not based on autonomous detection in case the explicit UE capability information is not available.

The network may also forward the UE capability information associated the channel spacing to other network nodes, which may use them for one or more radio management tasks.

The term channel spacing, carrier spacing, component carrier spacing, CA channel spacing etc. may interchangeably be used. But they all have the same meaning. For consistency the term channel spacing is used in the disclosure.

The idea of such a method, a UE channel spacing capability reporting and autonomous determination are not known in prior art.

Methods of Signaling UE Channel Spacing Capability to Network

The carrier aggregation needs to be configured by the network node(s). This is explained below The UE signals its channel spacing capability, which can be expressed in different forms e.g. explicitly indicating that it supports any channel spacing (e.g. unrestricted channel spacing—no constraint, spacing which may not be multiple of 300 kHz), channel spacing between component carriers (adjacent or not) shall be multiple of 300 kHz only or channel spacing between adjacent component carriers shall be multiple of 15 kHz (adjacent or not). The channel spacing capability depicts the type and characteristics of the supported channel spacing. If the UE supports any channel spacing then it may require more than one receiver and/or transmitter (e.g. multiple FFT/IFFT).

This signaling can either directly indicate UE channel spacing capability for the carrier aggregation or it can even be related to or part of other UE reported capabilities. But in either case the signaling here enables the network to uniquely identify the channel spacing capability (e.g. if a certain capability is always coupled to a certain channel spacing capability, then signaling of this specific capability is also an indication for channel spacing capability).

The UE may also implicitly indicate the carrier spacing capability by reporting that carrier aggregation is supported when the carrier spacing signalled by the network node is supported and by not indicating support for carrier aggregation when the carrier spacing used by the network nodes is not supported.

Some characteristics of the channel spacing capability will now be presented:

a. The UE reports its capability related to the type of carrier aggregation that the UE supports. The UE may report its channel spacing capability which may be applicable to a particular type of carrier aggregation e.g. intra-band contiguous CA, intra-band non-contiguous CA, inter-RAT contiguous or non-contiguous CA etc. Thus the UE channel spacing capability information may be tagged with CA type. For example "any channel spacing" may be tagged with intra-band non-contiguous CA. When a UE reports a capability that it supports intra-band non-contiguous CA then the network node can determine the "carrier spacing" supported by the UE. The network node can then use the determined carrier spacing when configuring this UE with ntra-band non-contiguous CA.

b. The UE reported channel spacing capability may also indicate that it is applicable for all supported frequency bands or for specific supported bands or for group of supported bands. For example, the UE may support 'any channel spacing' for CA in band 1 (the bands mentioned herein being defined by E-UTRA). But it may support 'channel spacing which is multiple of 300 MHz' for CA in band 7. Therefore the UE may report its channel spacing capability separately for each supported band or for a group of supported bands or for all bands. This will enable the network node to use the appropriate carrier spacing (i.e. one supported by the UE) when configuring the UE in a particular band.

c. The UE reported channel spacing capability may also indicate that it is applicable for both uplink and downlink carrier aggregations. Alternatively the UE may separately indicate the type of channel spacing capability for uplink and downlink carrier aggregations.

d. The UE reported channel spacing capability may also indicate that certain type of channel spacing (e.g. channel spacing which is multiple of 300 MHz) applicable in case the total aggregated block of spectrum or total aggregated bandwidth is limited to certain value e.g. 40 MHz.

Depending upon the information associated with the UE channel spacing capability, the capability could be a single field or it may comprise multiple fields of data containing different aspects, characteristics and details about the channel spacing capabilities.

Figure 8:
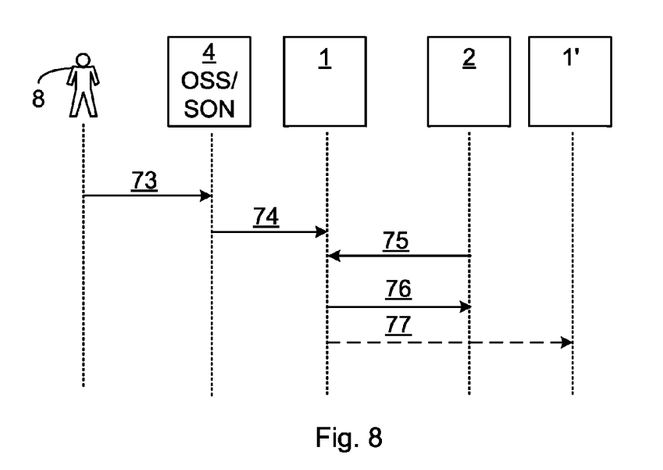
FIG. 8 is a schematic sequence diagram illustrating signalling in the network of FIG. 1

FIG. 8 is a schematic sequence diagram illustrating signalling in the network of FIG. 1. The network can utilise the UE channel spacing capability for CA if it is aware that CA is used in the network. In order to enable the radio network to be aware of the type of CA used, the operator enters the configuration data 73 in a node 4, which is capable of configuring a radio network node 1. This node 4 can be an Operating and Support System (OSS) or operation and maintenance (OAM), which thus receives and stores the configuration data 73. Another example is that of sell organizing network (SON) node, which can also configure the radio network node. Yet another example is that of any network node performing the network management or configuration task or any node capable of performing this task e.g. centralised network node, a base station etc.

The configuration data details which sites have carriers which belong to the same operating band and could be aggregated together. The data could be a single filed defining an intra band relation between two cells. OSS or SON node updates the eNodeB (eNB) configuration 74 i.e. it configures the radio network node (e.g. eNodeB) informing the eNodeB about available network nodes (e.g. other eNode Bs) within its coverage area supporting different types of CA.

At some point, the UE 2 reports its capability 75 of channel spacing between component carriers used in carrier aggregation, as described in more detail above and below. The first network node 1 then determines a CA configuration with appropriate channel spacing between CCs and configures the UE 2 by providing the configuration data 76 to the UE 2. Optionally, the first network node 1 also forwards the configuration data 77 to a second (and possibly more) network nodes 1'.

It will now be presented in some more detail how the reporting can be done by the UE.

In one embodiment the UE may report its channel spacing capability to the network either proactively i.e. without a request from the network. Examples of proactive reporting scenarios are: at any pre-determined times, during connection setup, after recovering from radio link failure, after RRC re-establishment, before or after handover, before or after PCell change or PCC change, when reporting other UE capabilities such as band capabilities etc.

Alternatively or additionally, the UE may report its channel spacing capability to the network upon receiving an explicit request from the network (e.g. eNode B, serving cell etc.). The network may request the UE to report its capability any time; most common scenarios are during connection setup, handovers, PCell/PCC change etc.

The UE may report any of the above information to the network (e.g. eNode B) using RRC signaling or using any other protocol (e.g. MAC).

UE Adapted for Informing of its Carrier Spacing Capabilities

Figure 12:
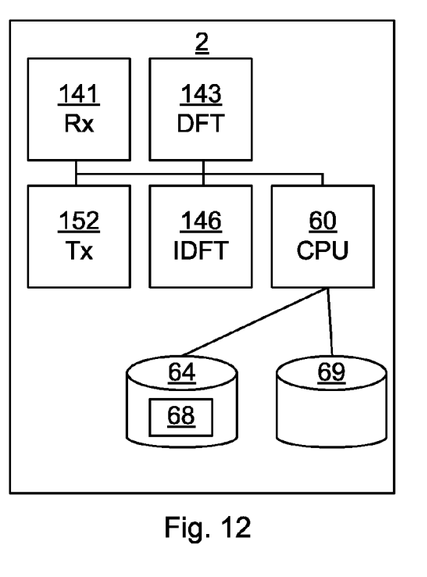
FIG. 12 is a block diagram of some of the components of the UE of FIG. 1.

FIG. 12 discloses a block diagram of an UE 2 that is adapted for indicating to the network its capabilities to handle alternative scenarios for channel spacing between component carriers. The UE 2 comprises a radio receiver 141, a radio transmitter 152, a receiver signal processing unit and that in the example comprises plural DFT (Discrete Fourier Transform) 143 (e.g. comprising one or more Fast Fourier Transform (FFT) devices) and that may also comprise plural IDTF (Inverse Discrete Fourier Transform) 146 (e.g. comprising one or more Inverse Fast Fourier Transform (IFFT) devices) that enables the UE to switch between different component carrier and that are separated with different granularities in frequency. The UE also comprises a signal processing unit at the transmitter side and that is connected to the transmitter 152. A central processor 60 controls the transmitter 152, receiver 141, the units on the RX signal processing. The central processor 60 is also adapted to provide control information to the input of the TX signal processing unit 151, for being transmitted in the UL. The central processor 60 is adapted to provide information or an indication on the UE capability to support channel spacing of component carrier, for this information or indication to be transmitted to the network.

The central processor 6o is provided using any combination of one or more of a suitable central processing unit (CPU), multiprocessor, microcontroller, digital signal processor (DSP), application specific integrated circuit etc., capable of executing software instructions contained in a computer program 68 stored in a computer program product 64, e.g. in the form of a memory, but not in the form of a signal or any form of electromagnetic wave. The central processor 60 can be configured to execute the method described with reference to FIGS. 10A-B below.

The computer program product 64 is here a memory being any combination of read-and-write memory (RAM) and read-only-memory (ROM). The memory also comprises persistent storage, which, for example, can be any single one or combination of magnetic memory, optical memory, solid state memory or even remotely mounted memory. The central processor 60 controls the general operation of the UE 2.

The UE 2 further comprises a data memory 69, which is a read-and-write memory. The data memory 69 may also comprise persistent storage, which, for example, can be any single one or combination of magnetic memory, optical memory, or solid state memory. Optionally, the computer program product 64 and the data memory 69 can form part of the same memory device.

Other components of the UE 2 are omitted in order not to obscure the concepts presented herein.

Methods in Network for Autonomous Identification of UE Capability

In case the UE capability information (i.e. channel spacing handling capabilities) is not available in the network, then network may autonomously attempt to identify whether the UE is capable of performing intra-band CA of CCs with different channel spacing. For example the network (e.g. serving eNode B) initiates the intra-band CA from multiple sites with a certain channel spacing. The network node then observes the UE feedback performance e.g. HARQ (Hybrid Automatic Repeat Request) ACK/NACK (Acknowledgement/Negative Acknowledgement)—performance #1. The network node may also have a priori information of the HARQ ACK/NACK performance when the intra-band aggregated CCs have been configured in a certain way before (e.g. macro BS)—performance #0 in radio conditions similar to those used for observing performance #1. If the difference between performance performances #0 and #1 is within a threshold, then the network may assume that UE is capable of performing intra-band CA of CCs with a certain channel spacing. The network node can store this detected/identified UE capability information for this UE and use this for performing intra-band CA from different sites with different channel spacing, whenever needed. The network node may also signal this identified UE capability to other network nodes such as other eNode B, core network (e.g. for various purposes like HO (Home Operator), O&M (Operations and Maintenance), SON, network management etc.).

Furthermore, if the network is aware that the UE is capable of inter-band CA of CCs with any carrier spacing (i.e. not limited to 15 or 300 kHz), then the network may also assume that UE may be capable of handling the intra-band CA of CCs, with 15 kHz spacing or 300 kHz spacing. The network node (i.e. the identifying node) may signal this identified UE capability information to other network nodes e.g. core network node like MME (Mobility Management Entity), eNode B, O&M, SON etc.

The channel spacing capability is also associated with the UE receiver capability e.g. in terms of the supported FFT/IFFT for receiving and/or transmitting signals. For example in order to support any type of channel spacing the UE may have to implement more than one FFT/IFFT, since a single FFT and/or IFFT are typically limited to processing of CCs where the channel spacing is a multiple of 15 kHz. If the network determines or obtains information or is aware of the fact that the UE has more than one FFT/IFFT (e.g. 2 FFT/IFFT) and support certain CA type (e.g. NC (non-contiguous) carrier aggregation) then the network may consider that UE can use 'any channel spacing' for the CA or for specific CA type.

Determination of UE Channel Spacing Capability Based on Pre-Defined Rule

The network can also determine the UE supported channel spacing capability based on one or more pre-defined rules.

For example, it may be pre-defined that UE supporting certain type of CA (e.g. non-contiguous CA, inter-band CA) also supports certain type of channel spacing (e.g. any channel spacing or that there is no constraint etc.).

For example, it may also be pre-defined that in certain bands (e.g. in large bands such as band 42, band 1 etc.) the UE supports certain type of channel spacing.

For example, it may also be pre-defined that if UE supports inter-band CA then it may also support any type of channel spacing when configured in non-contiguous CA.

The pre-defined rule can be the same for UL CA and DL CA or they can be separate for UL CA and DL CA.

Determination of Channel Spacing Based on Pre-Defined Rule

The UE may autonomously determine the channel spacing based on the carrier spacing used and other information signalled by the network node, e.g. carrier type (primary, secondary), whether carrier aggregation is used, etc.

One example includes when the network signals the carrier frequency of the primary and secondary carrier, but where the carrier frequencies are signalled as an even multiple of 100 kHz. The UE will then find the frequency closest to the carrier frequency of the secondary carrier such that the difference between the primary and secondary carrier is an even multiple of 15 kHz. This frequency will then be used as the carrier frequency of the secondary carrier, even though a different frequency was signalled for the secondary carrier.

It may also be specified and know to the UE that for certain bands and certain types of CA the carrier spacing between primary and secondary carriers should not be based on 100 kHz channel spacing, but a channel spacing which is a multiple of 15 kHz instead.

Methods in Network of Using UE Channel Spacing Capability for CA

The network uses any information associated with the UE channel spacing capability, which may be obtained based on UE signaling, autonomous determination or on pre-defined rules for deciding whether to configure the UE in a particular CA mode or not (e.g. whether to configure the UE in NC CA in certain band or not).

Therefore, the UE is configured to utilise component carrier resources when doing carrier aggregation if configuration data so allows, the UE is capable and the network decides to schedule data on several component carriers. To enable this CA operation the network will select appropriate CCs for CA based on the UE supported capability. The network will then configure the UE to operate in the corresponding CA mode. Similarly, if the UE supports channel spacing which is multiple of 15 kHz then network may configure the UE for carrier aggregation of normal CC with segment (aka flexible carrier etc.).

Otherwise the UE may be configured to operate in single carrier mode or in a CA mode which is possible with default carrier spacing.

Methods of Signaling the UE Channel Spacing Capability to Other Network Nodes

The received or determined UE channel spacing capability information may also be exchanged over the interfaces between the network nodes e.g. over X2 between eNode Bs or between eNode Bs and RRH or between any set of network nodes or between eNode Bs and primary node in CoMP scenario etc. For example the capability information may be provided by the serving network node (e.g. serving eNode B) to the target eNode B at the time of handover. The UE capability information may be exchanged between the nodes transparently (e.g. in transparent container) or non-transparently (i.e. the receiving node reads the information before sending it to another node). The UE channel spacing capability information may also be signalled by the radio node (e.g. eNode B), which has this information to other network nodes. Examples of other network nodes are SON, OAM, OSS, MDT, positioning node, network monitoring node, network planning node, core network node, etc. The other network node may use them for one or more radio network operational tasks. Examples radio network operational tasks are radio network planning, tuning and configuration of parameters such as number of carriers, carrier BW, deployment of network nodes etc. The positioning node (e.g. E-SMLC) may use this information to decide whether to configure particular type of positioning measurement or not; examples of positioning measurements are RSTD, RSRP, RSRQ, UE Rx-Tx time difference measurement, BS Rx-Tx time difference measurement etc.

Embodiments presented herein are also applicable to any network deployment scenarios in which the UE aggregates the CCs transmitted from any set of nodes e.g. macro-macro deployment, CoMP etc.

Figures 9A, 9B:
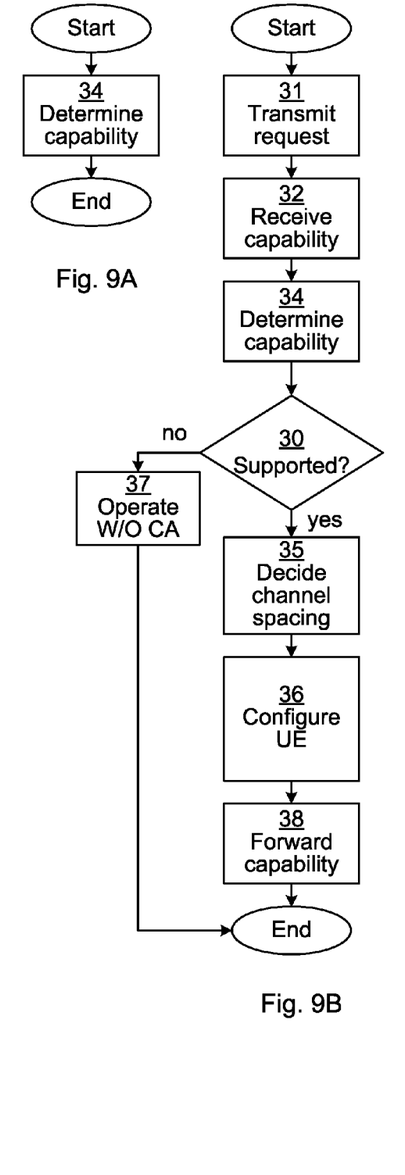
FIGS. 9A-C are flow charts illustrating methods for obtaining a capability of channel spacing between component carriers used in carrier aggregation, performed in the network node of FIG. 1.
Figure 9C:
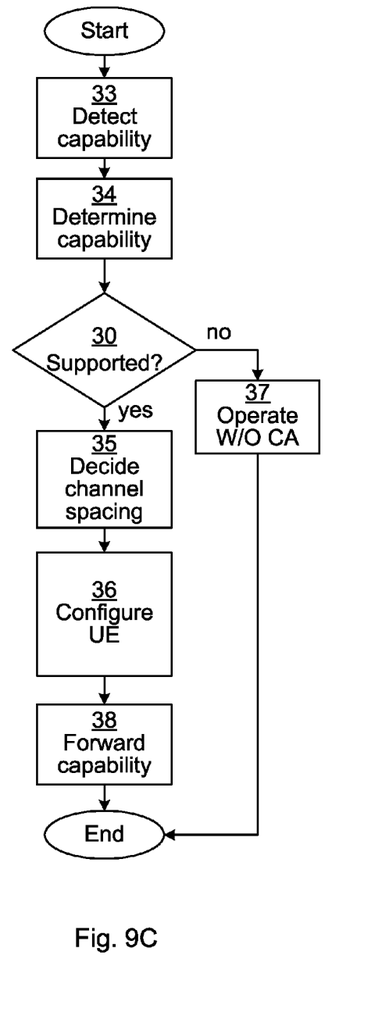

FIGS. 9A-C are flow charts illustrating methods for obtaining a capability of channel spacing between component carriers used in carrier aggregation, performed in the network node of FIG. 1. Any feature presented above can, where appropriate, be applied to the steps presented below and are thus not described here again.

In FIG. 9A, a flow chart is shown for a method for obtaining a capability of channel spacing between component carriers used in carrier aggregation, for a UE.

In a determine capability step 34 of one embodiment, the network node determines the capability of channel spacing for a UE based on signalling between the UE and the network node. The channel spacing capability comprises at least one of the alternatives of: a multiple of 300 kHz, a multiple of 15 kHz and any other channel spacing.

In a determine capability step 34 of one embodiment, the capability of channel spacing for a UE is determined based on a pre-defined rule relating a channel spacing to a type of carrier aggregation. Also here, the channel spacing capability comprises at least one of the alternatives of: a multiple of 300 kHz, a multiple of 15 kHz and any other channel spacing.

In FIG. 9B, a method is shown with more steps than the method illustrated in FIG. 9A.

In an optional transmit request step 31, a request for capability of channel spacing is transmitted to the UE.

In a receive capability step 32, the network node receives signalling from the UE. This signalling explicitly indicates the capability of channel spacing for the UE.

After the determine capability step 34, there is a conditional supported step 30. In the conditional supported step 30, it is determined whether the determined capability of channel spacing for the UE is supported by the network node. If this is the case, the method proceeds to a decide channel spacing step 35. Otherwise, the method proceeds to an operate without CA step 37.

In the decide channel spacing step 35, the network node decides what channel spacing to use between component carriers in carrier aggregation for the UE, based on the determined capability of channel spacing for the UE. The channel spacing is selected to be one which is supported by the UE.

Optionally, the decision is also based on the channel spacing of available component carriers. This is in a scenario where there are several component carriers' configurations available in the cellular network of the network node. These configurations can have channel spacing being a multiple of 300 Hz and channel spacing being a multiple of 15 kHz.

In a configure UE step 36, the UE is configured to operate in carrier aggregation with a channel spacing between component carriers based on the determined capability of channel spacing for the UE. More specifically, the decided channel spacing is provided to the UE for use in CA.

In a forward capability step 38, the determined capability of channel spacing for the UE is forwarded to other network nodes.

In the operate without carrier aggregation step 37, the network node provides no carrier aggregation in communication with the particular UE.

FIG. 9C is a flow chart illustrating one embodiment of a method performed in the network node to obtain a capability of channel spacing CA of a UE. The steps of FIG. 9B will not be described again, unless they differ from what is described with reference to FIG. 9A.

In a detect capability step 33, the capability of channel spacing is detected by comparing performance of intra-band carrier aggregation when the UE is connected to different cells, where component carriers in some cells are sent with 300 kHz channel spacing, in other cells with 15 KHz or with any other channel spacing. Optionally, this detecting may comprise comparing the performance of intra-band carrier aggregation with a pre-determined carrier aggregation performance.

In one embodiment of the step of determining capability 34, the capability of channel spacing is determined based on a type of carrier aggregation supported by the UE.

In one embodiment of the step of determining capability 34, the capability of channel spacing is determined based on a number of IFFT/FFT, Inverse Fast Fourier Transform/Fast Fourier Transform, devices which are supported by the UE receiver and/or UE transmitter. In particular, the network node can determine that the UE supports any channel spacing when the UE supports more than one IFFT/FFT for carrier aggregation.

In one embodiment, the step of determining capability 34, the capability of channel spacing for the UE is determined to be any channel spacing when non-contiguous carrier aggregation is supported by the UE.

In one embodiment, the step of determining capability 34, the capability of channel spacing for the UE is determined to be any channel spacing when inter-band carrier aggregation is supported by the UE.

In one embodiment of the step of determining capability 34, the capability of channel spacing is determined based upon what the frequency band(s) are used for carrier aggregation.

Figure 10A:
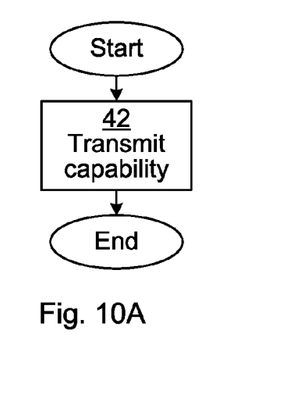
FIGS. 10A-B are flow charts illustrating methods for providing a capability of channel spacing between component carriers used in carrier aggregation, performed in the user equipment of FIG. 1.
Figure 10B:
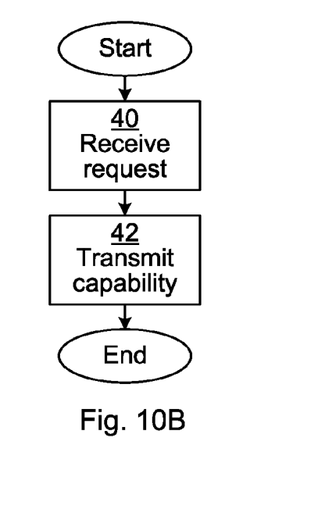

FIGS. 10A-B are flow charts illustrating methods for providing a capability of channel spacing between component carriers used in carrier aggregation, performed in the UE 2 of FIG. 1. Any feature presented above can, where appropriate, be applied to the steps presented below and are thus not described here again.

Looking first to FIG. 10A, there is a transmit capability step 42. In the transmit capability step 42, the UE transmits signalling to the network node. The signalling can explicitly comprise a capability of channel spacing between component carriers used in carrier aggregation for the UE. Again, the channel spacing comprises at least one of the alternatives of: a multiple of 300 kHz, a multiple of 15 kHz, and any other channel spacing. This step corresponds to, in the network node, the receive capability step 32 of FIG. 9B.

In one embodiment, the capability is transmitted separately for each supported band. In one embodiment, the capability is transmitted for a group of supported bands.

In one embodiment, the capability is transmitted separately for uplink and downlink carrier aggregation. In one embodiment, the capability is transmitted jointly for both uplink and downlink carrier aggregation.

In one embodiment, the step 42 of transmitting capability is performed proactively, i.e. without a request from the network.

The flow chart of FIG. 10B shows another embodiment. Here, the there is a receive request step 40. In the receive request step 40, a request for capability of channel spacing is received from the network node. This step corresponds to, in the network node, the transmit request step 31 of FIG. 9B.

In this embodiment, the step of transmitting 42 is performed in response to the step 40 of receiving a request.

Figure 11:
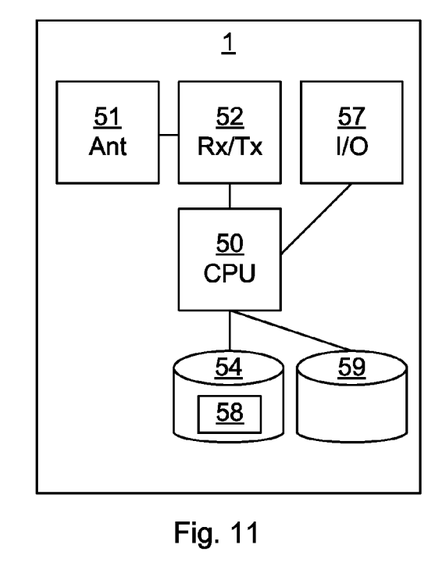
FIG. 11 is a block diagram of some of the components of the network node of FIG. 1.

FIG. 11 is a schematic diagram showing some components of the network node 1 arranged to execute the methods of FIG. 9A-C. A processor 50 is provided using any combination of one or more of a suitable central processing unit (CPU), multiprocessor, microcontroller, digital signal processor (DSP), application specific integrated circuit etc., capable of executing software instructions contained in a computer program 58 stored in a computer program product 54, e.g. in the form of a memory, but not in the form of a signal or any form of electromagnetic wave. The processor 50 can be configured to execute the methods described with reference to FIGS. 9A-C above.

The computer program product 54 is here a memory being any combination of read-and-write memory (RAM) and read-only-memory (ROM). The memory also comprises persistent storage, which, for example, can be any single one or combination of magnetic memory, optical memory, solid state memory or even remotely mounted memory. The processor 50 controls the general operation of the network node 1.

The network node 1 further comprises a data memory 59, which is a read-and-write memory. The data memory 59 may also comprise persistent storage, which, for example, can be any single one or combination of magnetic memory, optical memory, solid state memory or even remotely mounted memory. Optionally, the computer program product 54 and the data memory 59 can form part of the same memory device.

The network node 1 further comprises an I/O interface 57 for communicating with external entities such as the core network. Moreover, the network node 1 comprises one or more transceivers 52 and one or more antennas 51 for communicating with UEs 2.

The embodiments presented herein allow the operator to optimise channel spacing for carrier aggregation. Moreover, constraint on the network implementation is avoided. Furthermore, it enables the UE vendors to build UEs with different channel spacing depending upon the importance of scenario, bands etc.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method of operation in a network node operating in a wireless communication network, the method comprising:
   determining a channel spacing capability of a User Equipment (UE) operating in the wireless communication network, the channel spacing capability defining the channel spacing or spacings supported by the UE as between Component Carriers (CCs) used for Carrier Aggregation (CA), including determining whether the UE supports unrestricted channel spacing and, if not, determining a restricted channel spacing that is supported by the UE;
   selecting a CA configuration for the UE in dependence on the determined channel spacing capability of the UE; and
   configuring the UE according to the selected CA configuration, by transmitting CA configuration information to the UE.

2. The method of claim 1, wherein determining the channel spacing capability of the UE comprises autonomously determining the channel spacing capability of the UE in the absence of receiving an explicit indication of the channel spacing capability, based on inferring the channel spacing capability of the UE from observing a communication performance of the UE during CA operation with one or more channel spacings, or based on inferring the channel spacing capability from a rule that relates a related CA capability of the UE that is known to the network node, to the channel spacing capability of the UE.

3. The method of claim 1, wherein determining the channel spacing capability of the UE includes determining whether the UE supports a certain channel spacing by evaluating a communication performance of the UE during CA-based communication with the UE, using the certain channel spacing.

4. The method of claim 3, wherein evaluating the communication performance comprises comparing the communication performance to a pre-determined threshold.

5. The method of claim 1, wherein determining the channel spacing capability of the UE comprises inferring that the UE supports unrestricted channel spacing, based on determining that the UE supports one or more of the following: more than one Inverse Fast Fourier Transform/Fast Fourier Transform (IFFT/FFT) for CA; non-contiguous CA; and inter-band CA.

6. The method of claim 1, wherein determining the channel spacing capability of the UE includes inferring the channel spacing capability of the UE from an indication of the frequency bands supported by the UE for CA.

7. The method of claim 1, wherein, in response to determining that the UE does not support unrestricted channel spacing, determining whether the UE supports a channel spacing that is a multiple of 15 kHz, or supports a channel spacing that is a multiple of 300 kHz, or supports both such multiples.

8. The method of claim 1, wherein selecting the CA configuration for the UE in dependence on the determined channel spacing capability of the UE comprises selecting, or limiting the selection of, a CA mode to be used for the UE, in dependence on the determined channel spacing capability of the UE.

9. The method of claim 8, wherein, in response to determining that the UE does not support unrestricted channel spacing and instead supports only restricted channel spacing, selecting the CA configuration of the UE comprises avoiding the selection of an available CA configuration that does not conform with the restricted channel spacing supported by the UE.

10. A network node configured for operation in a wireless communication network, the network node comprising:
    communication circuitry configured to communicate directly or indirectly with a User Equipment (UE) operating in the wireless communication network; and
    processing circuitry operatively associated with the communication circuitry and configured to:
        determine a channel spacing capability of a User Equipment (UE) operating in the wireless communication network, the channel spacing capability defining the channel spacing or spacings supported by the UE as between Component Carriers (CCs) used for Carrier Aggregation (CA), including determining whether the UE supports unrestricted channel spacing and, if not, determining a restricted channel spacing that is supported by the UE;
        select a CA configuration for the UE in dependence on the determined channel spacing capability of the UE; and
        configure the UE according to the selected CA configuration, by transmitting CA configuration information to the UE.

11. The network node of claim 10, wherein the processing circuitry is configured to determine the channel spacing capability of the UE autonomously, in the absence of receiving an explicit indication of the channel spacing capability, based on being configured to infer the channel spacing capability of the UE from observing a communication performance of the UE during CA operation with one or more channel spacings, or to infer the channel spacing capability from a rule that relates a related CA capability of the UE that is known to the network node, to the channel spacing capability of the UE.

12. The network node of claim 10, wherein the processing circuitry is configured to determine whether the UE supports a certain channel spacing by evaluating a communication performance of the UE during CA-based communication with the UE, using the certain channel spacing.

13. The network node of claim 12, wherein the processing circuitry is configured to evaluate the communication performance by comparing the communication performance to a pre-determined threshold.

14. The network node of claim 10, wherein the processing circuitry is configured to infer that the UE supports unrestricted channel spacing, responsive to determining that the UE supports one or more of the following: more than one Inverse Fast Fourier Transform/Fast Fourier Transform (IFFT/FFT) for CA; non-contiguous CA; and inter-band CA.

15. The network node of claim 10, wherein the processing circuitry is configured to infer the channel spacing capability of the UE from an indication of the frequency bands supported by the UE for CA.

16. The network node of claim 10, wherein, in response to determining that the UE does not support unrestricted channel spacing, the processing circuitry is configured to determine whether the UE supports a channel spacing that is a multiple of 15 kHz, or supports a channel spacing that is a multiple of 300 kHz, or supports both such multiples.

17. The network node of claim 10, wherein the processing circuitry is configured to select the CA configuration for the UE in dependence on the determined channel spacing capability of the UE, based on selecting, or limiting the selection of, a CA mode to be used for the UE, in dependence on the determined channel spacing capability of the UE.

18. The network node of claim 17, wherein, in response to determining that the UE does not support unrestricted channel spacing and instead supports only restricted channel spacing, the processing circuitry is configured to avoid the selection of an available CA configuration that does not conform with the restricted channel spacing supported by the UE.

* * * * *

UNITED STATES PATENT AND TRADEMARK OFFICE
CERTIFICATE OF CORRECTION

PATENT NO.         : 9,577,802 B2
APPLICATION NO.    : 13/812199
DATED              : February 21, 2017
INVENTOR(S)        : Kazmi et al.

Page 1 of 1

It is certified that error appears in the above-identified patent and that said Letters Patent is hereby corrected as shown below:

In Column 9, Line 20, delete "sub-Mocks" and insert -- sub-blocks --, therefor.

In Column 9, Line 21, delete "sub-Mock" and insert -- sub-block --, therefor.

In Column 10, Line 58, delete "boa" and insert -- 10a --, therefor.

In Column 13, Line 1, delete "sell" and insert -- self --, therefor.

In Column 14, Line 1, delete "6o" and insert -- 60 --, therefor.

In Column 17, Line 17, delete "300 Hz" and insert -- 300 kHz --, therefor.

Signed and Sealed this
First Day of August, 2017

Joseph Matal
*Performing the Functions and Duties of the*
*Under Secretary of Commerce for Intellectual Property and*
*Director of the United States Patent and Trademark Office*